United States Patent [19]

Wu

[11] Patent Number: 4,874,974

[45] Date of Patent: Oct. 17, 1989

[54] MOTOR WITH AN AUTO OUTPUT ADJUSTING DEVICE

[76] Inventor: Yao-Yu Wu, No. 181, Sec. 4, Chin-Hwa Road, Tainan, Taiwan

[21] Appl. No.: 130,602

[22] Filed: Dec. 9, 1987

[51] Int. Cl.⁴ .............................................. H02K 3/00
[52] U.S. Cl. ................................... 310/112; 310/68 B; 318/798
[58] Field of Search .................. 310/68 R, 68 B, 112, 310/114; 318/798, 805, 806, 818, 434, 819, 820, 432, 433, 340, 351, 354, 360, 502, 538, 539; 73/862.32, , 862.33

[56] References Cited

U.S. PATENT DOCUMENTS

| | | | |
|---|---|---|---|
| 3,129,300 | 4/1964 | Moyles | 73/862.32 |
| 3,781,616 | 12/1973 | Mokrytzki et al. | 318/340 |
| 4,445,075 | 4/1984 | Fry | 318/434 |
| 4,550,267 | 10/1985 | Vaidya | 310/112 |
| 4,670,697 | 6/1987 | Wrege et al. | 318/785 |

FOREIGN PATENT DOCUMENTS

| | | | |
|---|---|---|---|
| 883925 | 12/1961 | United Kingdom | 310/112 |
| 8201104 | 4/1982 | World Int. Prop. O. | 318/351 |

Primary Examiner—Peter S. Wong
Assistant Examiner—Judson H. Jones
Attorney, Agent, or Firm—Ladas & Parry

[57] ABSTRACT

A motor with an auto output adjusting device. This motor has a plurality of stator independent coils to drive the rotor separately and a torque sensor sensing how large the load of the machine the motor drives is and commanding an electric circuit for adjusting the number of said stator independent coils to get electricity according to the load sensed by said torque sensor. Then this motor can economize the electric power by cutting down the current used in driving the machine when the machine is working idle or below its maximum load.

3 Claims, 8 Drawing Sheets

MOTOR WITH AN AUTO OUTPUT ADJUSTING DEVICE

BACKGROUND OF THE INVENTION

So far, the maximum output of a motor used in a machine such as a shaper, a press, a cutter, a roller, etc. is determined according to the maximum work load of the machine driven by the motor. Therefore, when a machine is idling or working with a light load, the motor still revolves nearly at its high output, which results in the waste of electric power.

This invention reduces as much as possible the waste of electric power used in the motor driving such a machine as mentioned above.

SUMMARY OF THE INVENTION

According to this invention, a motor is provided with an output adjusting device. The motor has a stator coil is which automatic made up of a plurality of independent coils that can independently drive the rotor, and a set of electric circuits that control the number of those independent coils to be supplied with power separately according to the amount of the load on the machine.

The shaft of the motor is divided into two parts, the main shaft and a secondary one; the secondary shaft is set at the transmitting end of the main shaft and a torque sensor is set between both shafts for sensing the torque that is transmitted to the secondary shaft by the main shaft, and then the number of independent coils needed to be supplied with power is automatically determined by the set of electric circuits and such coils receive electricity accordingly.

The structure of the torque sensor is comprises a main gear disc and a secondary gear disc facing and engaging with each other; the main gear disc is fixed on the main shaft of the motor, while the secondary gear disc is fixed on the secondary shaft. The main and the secondary gear discs have gears or members which protrude longitudinally and a spring is set between each gear of the main gear disc and gear of the secondary gear disc. On the peripheral surface of the main gear disc are set protrusions having a side facing the secondary gear disc which has an inclined surface. On the peripheral surface of the secondary gear disc are set supporters confronting the protrusions of the main gear disc. A sensing rod is set between the protrusion and the supporter, with a spring put longitudinally around the sensing rod. The sensing rod has one end touching the inclined surface of the protrusion and the other end penetrating the supporter and being fixed with a ring. The ring and the motor cap are separated by the ring shutter. A number of photoelectric switches, one of said photoelectric switches located adjacent to each said active rod and arc controlled by the ring shutter. The compression of the springs between each protruding member of the main gear disc and each protruding member of the secondary gear disc corresponds to the load on the motor. The distance between each gear of the main protruding member disc and each protruding member of the secondary gear disc can change shorter or longer in response to load changes so that the inclined surface on the protrusion pushes or release the sensing rod, which in turn moves the ring shutter in the photoelectric switch. The photoelectric switch, in turn, controls the number of starter coils which are energized The photoelectric switches mentioned above control the turning-on or turning-off the 2nd stator coil to the Nth stator coil, and are always cut off by the ring shutter under normal condition.

A fly wheel is set at the untransmitting end of the motor to stabilize the turning inertia.

In short, the object of this invention is adjusting the number of the independent stator coils to get electricity, in other words, to adjust the output of the motor according to the load of the machine the motor drives, and thus economizing the electric power that would otherwise be wasted while the machine works below its maximum load or when it is at idle.

BRIEF DESCRIPTION OF THE DRAWINGS

FIG. 2-1 is a cross-section view of the second example of the motor in this invention.

FIG. 3-1 is the diagram of the circuit of the stator independent coils in this invention.

DETAILED DESCRIPTION OF THE INVENTION

Figure 2:
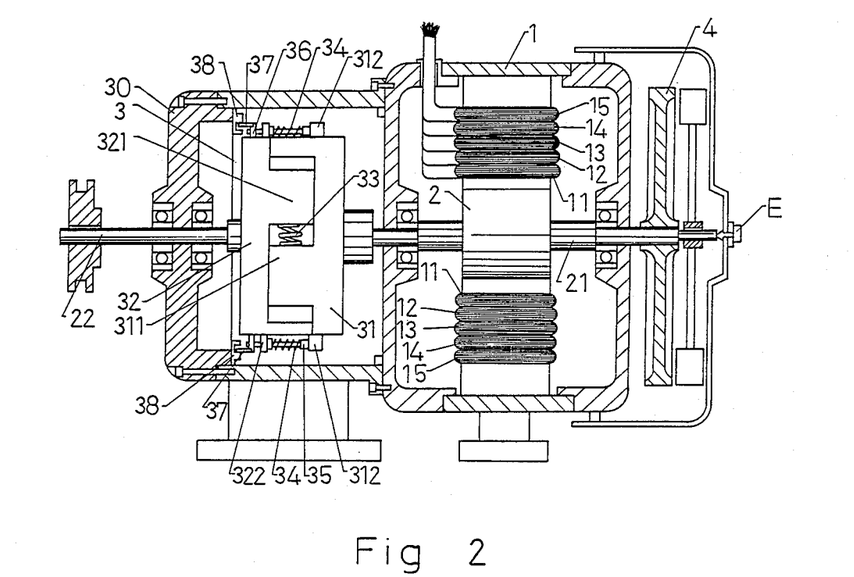
FIG. 2 is a cross-section view of the first example of the motor in this invention.

As can be seen by reference to FIG. 2, stator 1 has five independent coils 11, 12, 13, 14, 15 would around the same core, and rotor 2 includes a main shaft 21 and a secondary shaft 22 fixed at the transmitting end of main shaft 21. Torque sensor 3 is connected between main shaft 21 and secondary shaft 22, and fly wheel 4 is disposed at the non-transmitting end of main shaft 21.

Figure 21:
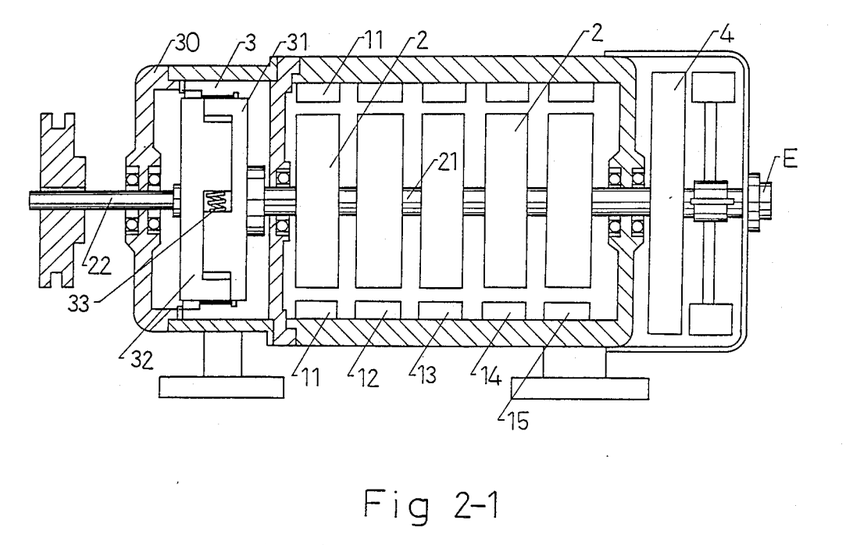

FIG. 7-1 shows an alternate embodiment, where independent coils 11, 12, 13, 14, 15 are divided to have separate parts on rotor 2. In other words, each coil has its own part of rotor 2 for the rotor; this structure also has the same effect as the first one mentioned above does.

Figure 1:
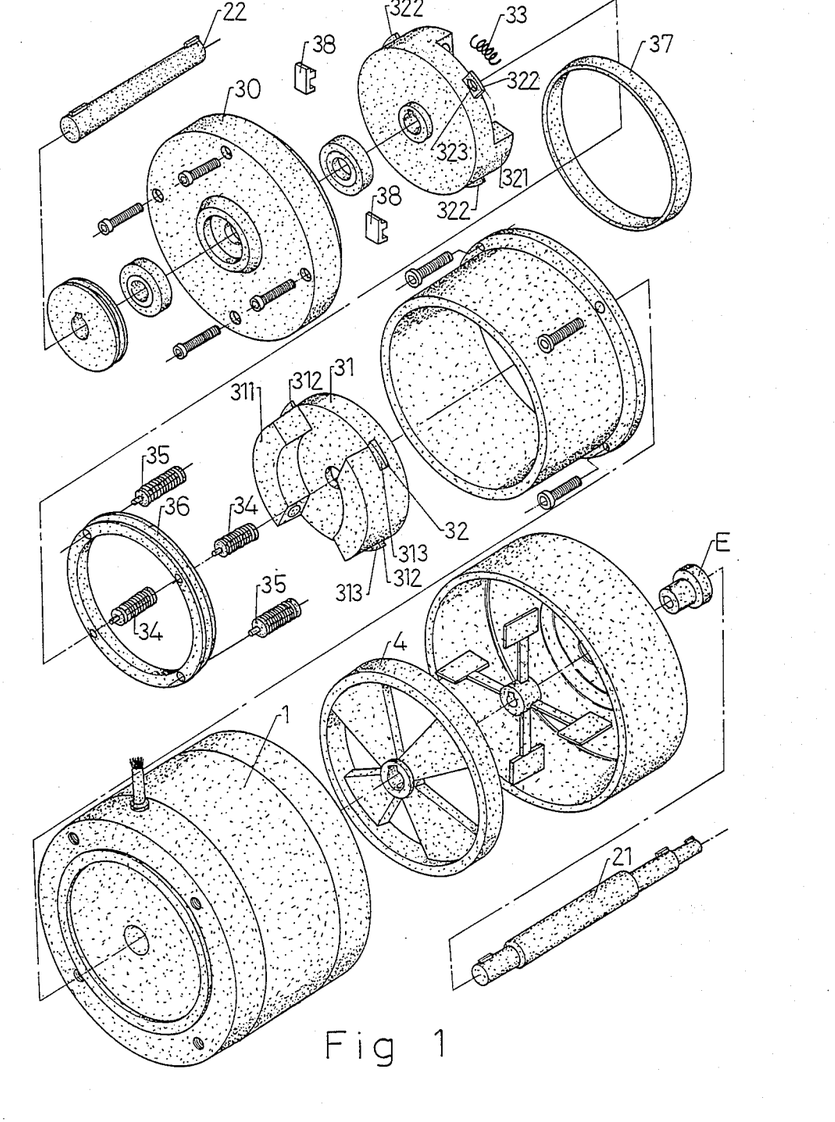
FIG. 1 is an exploded perspective view of the first example of the motor with an output adjustable device in this invention.

The internal construction of the torque sensor can be better seen in the exploded view of FIG. 1.

Figure 8:
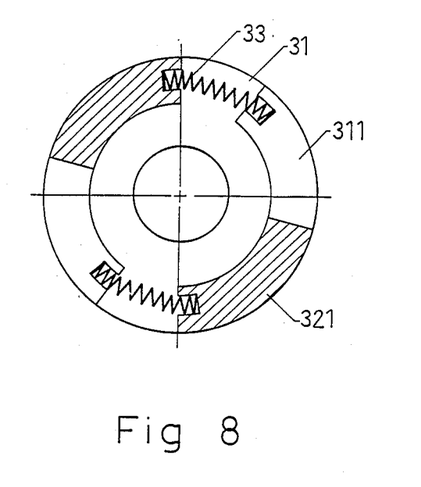
FIG. 8 is a view of the static interrelated position of the main and the secondary gear disc in this invention.

Torque sensor 3 includes main gear disc 31 fixed on main shaft 21 and secondary disc 32 fixed on secondary shaft 22 set facing and engaging each other with gears 311 of main gear disc 31 engaging with gears 321 of secondary gear disc 32 plus springs 33 set between both gears 311 and 321 as FIG. 8 shows. On the peripheral edge of main gear disc 31 are a set of protrusions 312, the protrusion facing secondary gear disc 32 having a spherically inclined surface 313 as FIG. 1 shows. On the peripheral edge of secondary gear disc 32 are a set of supporters 322 having a hole 323 bored in the center thereof, and sensing rods 35 are set penetrating through said holes 323 and are surrounded by spring 34. Sensing rods have one end touching the inclined surface of protrusions 312 and the other end fixed with ring 36 after penetrating through holes 323 of supporters 322. Ring 36 and the inside edge of motor cap 30 are respectively set with ring shutter 37 and photoelectric switches 38 facing each other.

Figure 3:
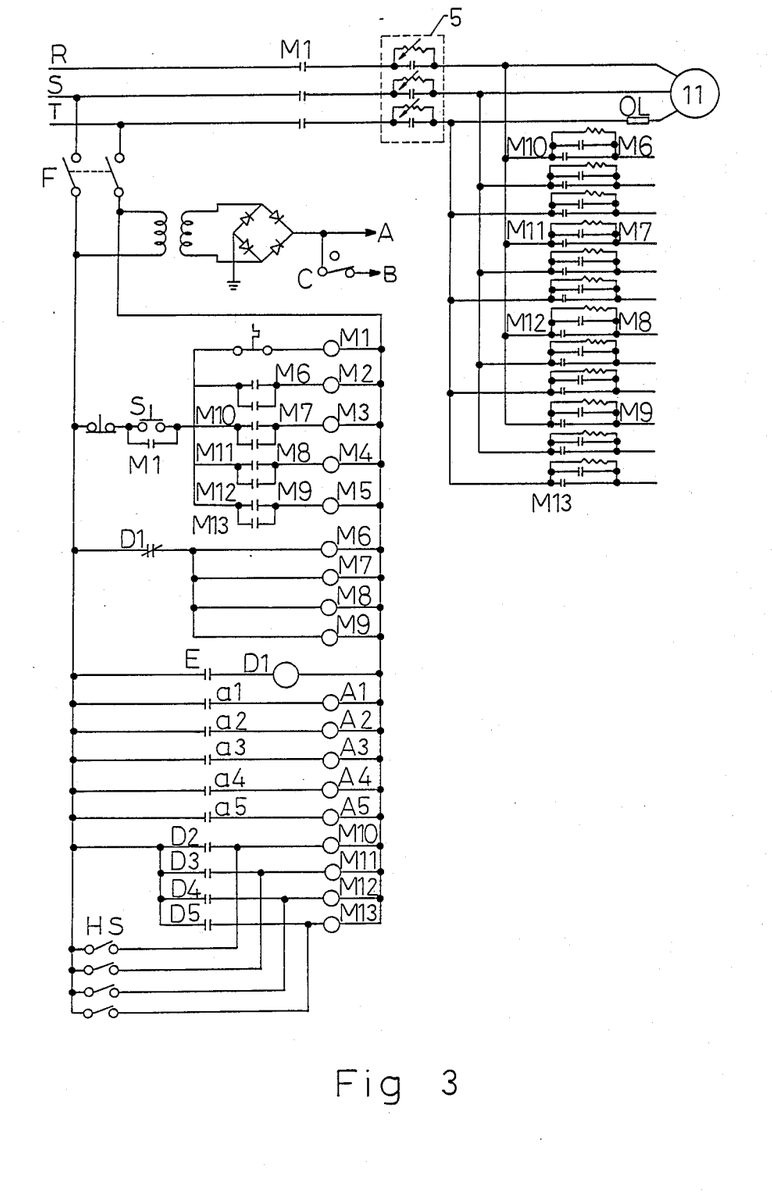
FIG. 3 is a diagram of the electric circuit used in this invention.
Figure 9:
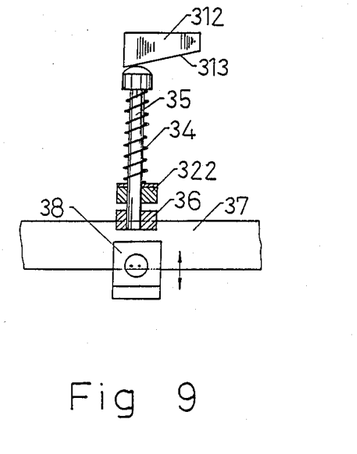
FIG. 9 is a view of the static interrelated position of the protrusion, the active rod, the ring shutter and the photoelectric switch in this invention.
Figure 31:
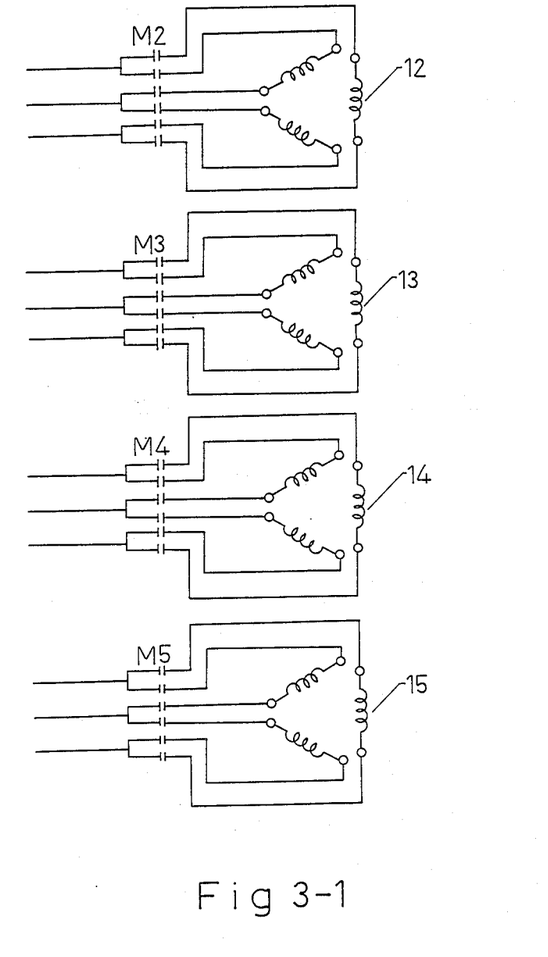

The electric circuit for adjusting the output of the motor in this invention is shown in FIGS. 3 and 3-1. The first independent stator coil 11 is directly turned on by the power switch, while the other stator coils are controlled by photoelectric switches 38; under normal conditions, said active rods 35 touch at the highest point of inclined surface 313 of protrusions 312 as shown in FIG. 9., forcing ring shutter 37 to fall into the notch of photoelectric switches 38 to cut off said switch 38.

Figure 4:
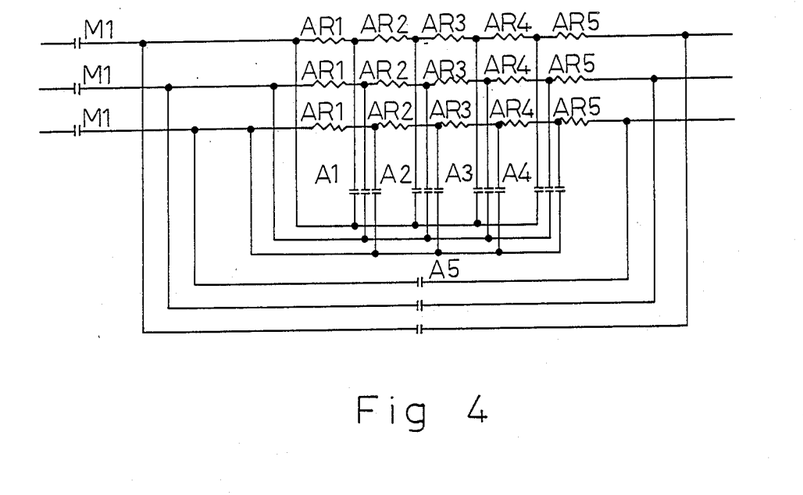
FIG. 4 is the diagram of the circuit of the resistances in this invention.

Variable resistance 5 shown in FIGS. 3, 4 is set for restricting the starting current for a motor of high capacity or high horse power but is unnecessary for a motor of low capacity.

To start this motor when the machine is quiet, first move switch C to the auto point and then turn on power switch F, making magnetic switches M6, M7, M8, M9 on, and besides, switch S commands magnetic switches M1, M2, M3, M4, M5 to activate, with the normally open contact point of magnetic switch M1 closed, to electrically to drive rotor 2.

Figure 5:
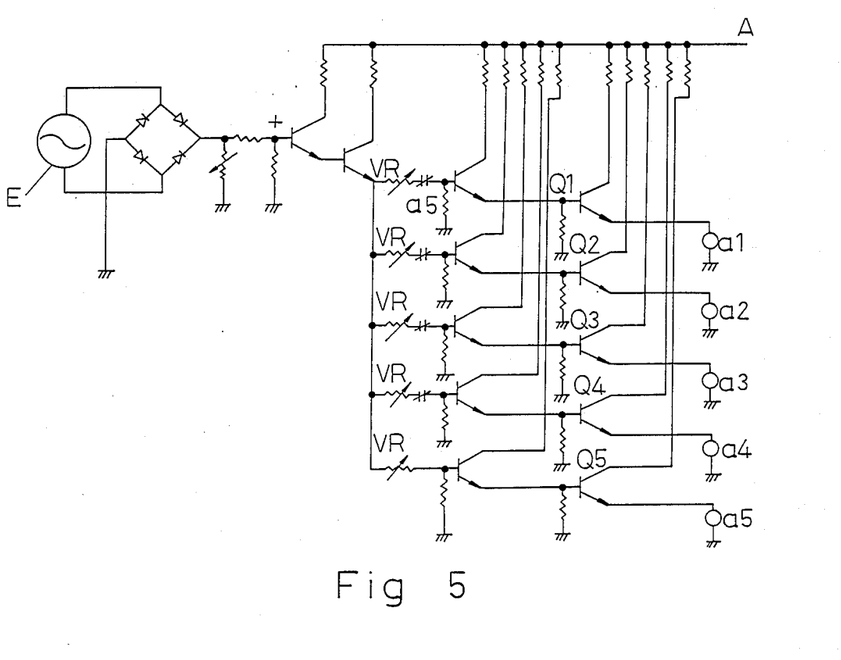
FIG. 5 is the diagram of the controlling circuit for the resistances in this invention.

Speed counter E set on the main shaft of the motor shown in FIGS. 1, 2, 5 has generating ability. The starting current of the motor has to pass resistances AR1, AR2, AR3, AR4, AR5 for being restricted its current as shown in FIG. 4; as the speed of the motor is increasing, transistors Q1, Q2, Q3, Q4, Q5 turn on in order thereby activating relays a1, a2, a3, a4, a5, and magnetic contacts A1, A2, A3, A4, A5 are closed in order, and thus resistances AR1, AR2, AR3, AR4, AR5 are taken out of the circuit in order. The starting operation of the motor will have be finished at the moment when magnetic switch contact A5 closes and, all resistances AR1, AR2, AR3, AR4, AR5 will then have been cut off, and magnetic switches A1, A2, A3, A4 may be opened.

The turning speed of the rotor of the motor has alreaddy reached the amount set in advance for speed counter E when magnetic switch contact 5A has been closed, and after the normally open contact point of speed counter E has been closed by speed counter E sensing the speed, relay contact D1 should be commanded to open so that magnetic switches M6, M7, M8, M9 will be cut off accordingly.

Figure 10:
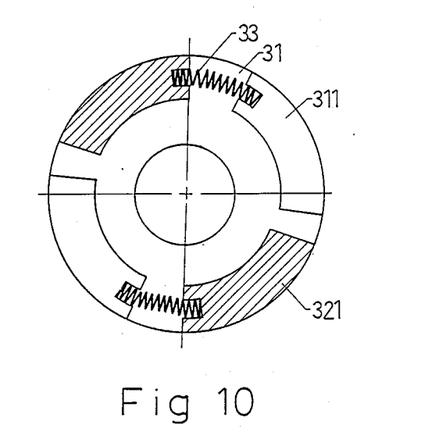
FIG. 10 is a view of the kinetic interrelated position of the main and the secondary gear disc in this invention.
Figure 11:
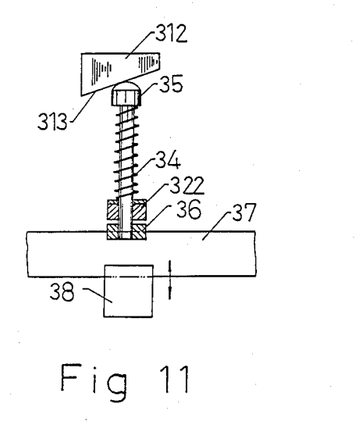
FIG. 11 is a view of the kinetic interrelated position of the protrusion, the active rod, the ring shutter and the photoelectric switch in this invention.

After the motor has been started, gears 311 of main gear disc 31 press against springs 33 as shown in FIG. 10 in transmitting the revolution to secondary shaft 22. Then the distance that springs 33 are contracted by gears 311 is equal to the distance that protrusions 312 move relative to supporters 322. The moving of protrusions 312 causes sensing rods 35 to move on inclined surfaces 313 from high to low as shown in FIG. 11 and ring shutter 37 is to be causes to retreat letting the light given off by the LED pass through closing photoelectric switches 38. As can be seen by reference to FIG. 6, switches 38 send a signal commanding transistors Q6, Q7, Q8, Q9 to drive relays D2, D3, D4, or D5 on. So it can be understood that once the motor is started magnetic switches M10, M11, M12, M13 from another circuit for separately supplying stator independent coils 12, 13, 14, 15 with electricity.

Figure 6:
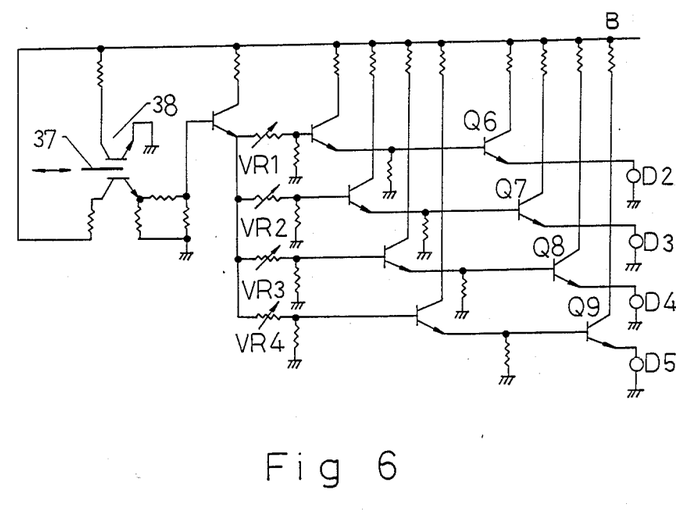
FIG. 6 is the diagram of the example of the photoelectric controlling circuit in this invention.

Therefore, if the working load of the machine still exceeds the output of stator independent coil 11 after the closing of relay D1 another group of magnetic switches already in the closed state M10, M11, M12 or M13 will retain at least one closed circuit of stator independent coils 12, 13, 14 or 15 according to the working load.

Figure 7:
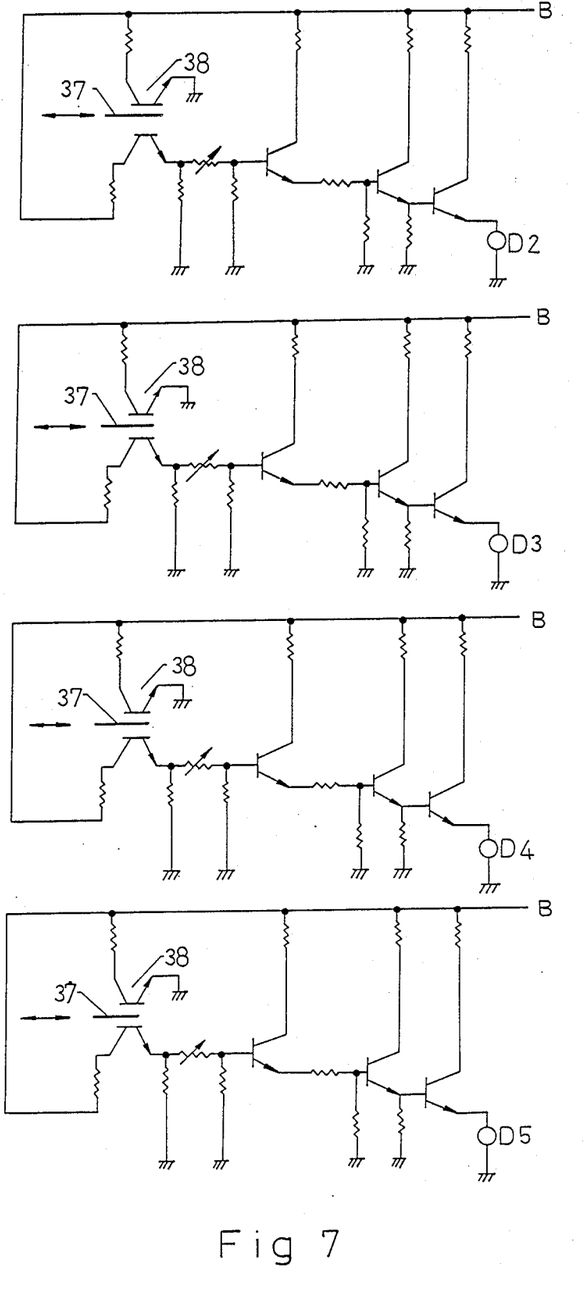
FIG. 7 is the diagram of the second example of the photoelectric controlling circuit in this invention.

Photoelectric switches 38 shown in FIG. 6, with the aid of variable resistances VR1, VR2, VR3, VR4, control individually relays D2, D3, D4, D5 to be closed or opened in accordance with the amount of light received from the LED. The equivalent circuit shown in FIG. 7 represents that four photoelectric switches set for individually controlling relays D2, D3, D4, D5 are located all differently from one another in the distance from ring shutter 37, and the sequential order in which ring shutter 37 move in four photoelectric switches decides the turning-on or turning-off of said relays D2, D3, D4, D5.

Magnetic switches M2, M3, M4, M5 are established for separating the phase coil of each stator independent coil lest those stator independent coils still not supplied with electricity should produce electromotive force during the working state of the motor.

The electric circuit used in this invention shown in FIG. 3 also includes a manual operation means in which switch C can be moved to the manually operational point first, and then switches HS can be optionally closed to turn on the stator independent coils needed in working the motor.

As the above description shows, this invention can be at any time adjusted in the output of the motor in accordance with the load the machine is receiving by means of changing the number of the stator independent coils needed to get electricity. Therefore, the operational current used in the motor during the idle or light working load of the machine is far less than that used in a conventional motor which always drives its machine with the maximum capacity.

What is claimed is:

1. A motor with an auto output adjusting device, comprising a main shaft, a secondary shaft, a stator and a rotor, said stator having a plurality of independent coils with separate contact points able to drive individually the rotor by only one or more than two of said independent coils, a torque sensor connected between the main and the secondary shafts for sensing the torque the main shaft transmits to the secondary shaft, and an electric circuit responsive to the torque sensed by said torque sensor to automatically increase the number of coils which are energized after the motor is started and in response to load changes, wherein said torque sensor comprises a main and a secondary gear disc facing and engaging each other, the main gear disc being fixed on the main shaft while the secondary gear disc is fixed on the secondary shaft, a plurality of members protrude longitudinally on both the main and the secondary gear discs, spring means are set between said protruding members of the main gear disc and the secondary gear disc, the peripheral edge of the main gear disc including protrusions having an inclined surface facing the secondary gear disc, the peripheral edge of the secondary gear disc having supporters which confront said protrusion and having a hole therein, a sensing rod having one end thereof touching the inclined surface of the protrusions on the main gear disc, penetrating through the hole of the confronting supporter of the secondary gear disc having the other end thereof operatively coupled to a ring shutter and photoelectric switches operatively controlled by said ring shutter, the protrusions of the main gear disc are synchronously moved to push or release the sensing rods, which then move the ring shutter out or in the photoelectric switches in response to load changes, said electric circuit coupling said photoelectric switches to command the turning-on or turning-off of the stator independent coils in response to said load changes.

2. The motor with an automatic load adjusting device as claimed in claim 1, wherein the stator independent coils are set on the same core but on a separate section each.

3. A motor with an automatic output adjusting device comprising;
- a stator having a plurality of independent coils;
- a rotor, positioned within said stator, able to be driven by one or more of said independent coils by an electric circuit;
- said rotor having a main shaft and a secondary shaft set at the transmitting end of said main shaft;
- a torque sensor, connected between said main shaft and said secondary shaft, for sensing the torque said main shaft has to transmit to said secondary shaft in order that said independent coils required to cope with the load of the machine will receive electricity from said electric circuit;
- said torque sensor comprising a main gear disc and a secondary gear disc facing and engaging each other, said main gear disc being fixed on the main shaft and said secondary gear disc being connected to said secondary shaft,
- said main gear disc and said secondary gear disc each having several members which protrude longitudinally therefrom;
- a spring set between said protruding members of the said main gear disc and protruding members of the said secondary gear disc;
- a plurality of protrusions having an inclined surface facing said secondary gear disc disposed on the peripheral surface of said main gear disc;
- a number of supporters having a hole therein disposed on the peripheral surface of said secondary gear disc;
- sensing rods having one end thereof touching the inclined surface of each said protrusion of said main gear disc and with the other end penetrating through said hole of each said supporter of said secondary gear disc;
- a shutter operatively connected to said sensing rods;
- photoelectric switches responding to movement of said shutter, said photoelectric switches controlling said electric circuit to increase and decrease the number of independent coils receiving electricity in response to the load sensed by said torque sensor.

* * * * *